J. L. GOUCHER.
METHOD OF TREATING MILK.
APPLICATION FILED SEPT. 18, 1906.
922,134.
Patented May 18, 1909.
2 SHEETS—SHEET 1.
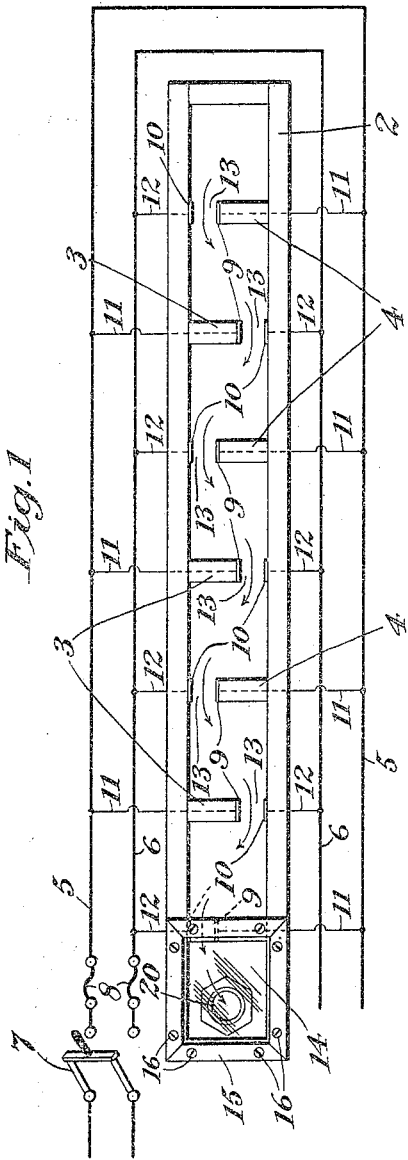

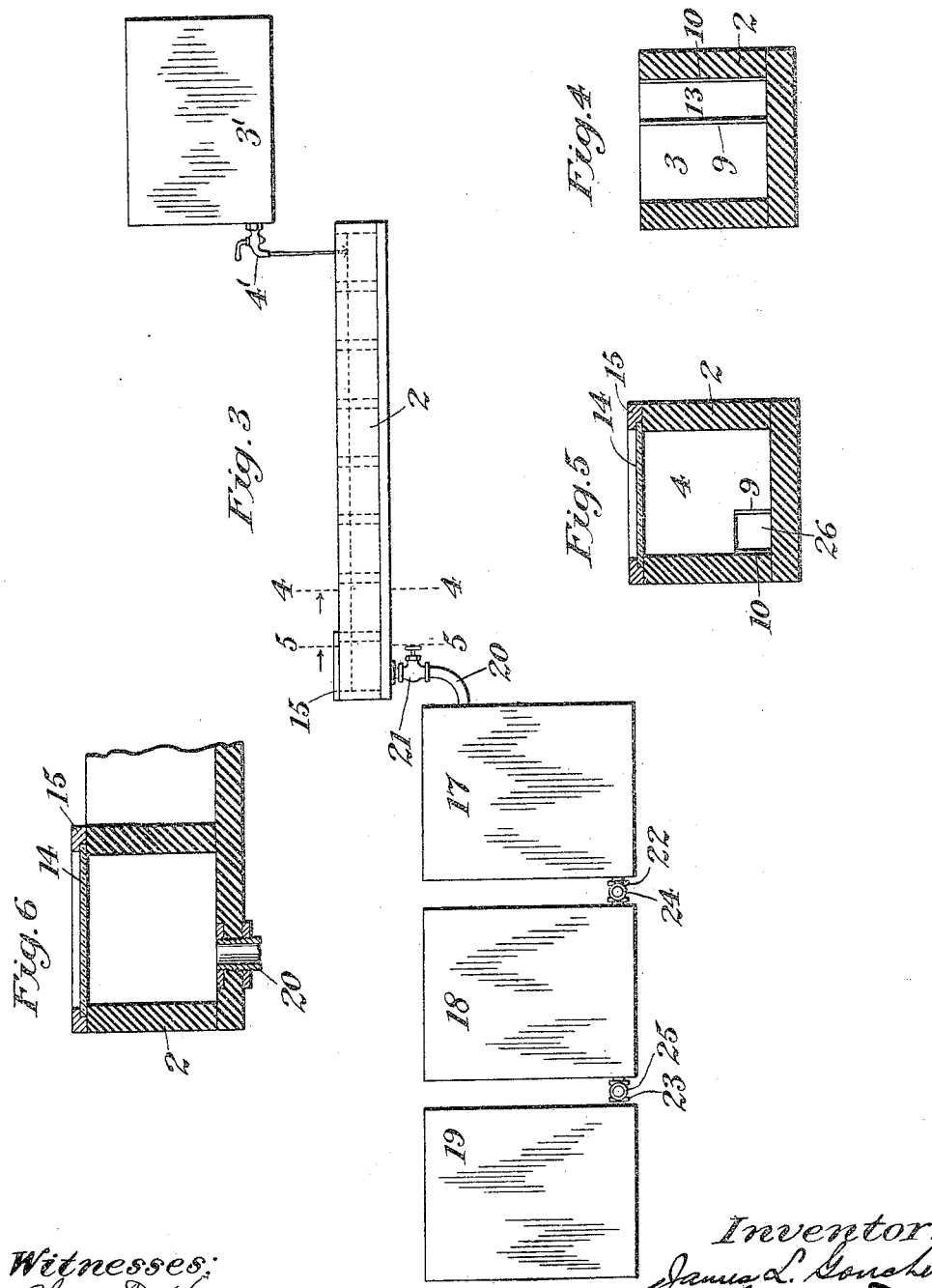

UNITED STATES PATENT OFFICE.

JAMES L. GOUCHER, OF NEW YORK, N. Y., ASSIGNOR TO GOUCHER ELECTRIC PURIFYING CO., OF NEW YORK, N. Y., A CORPORATION OF NEW YORK.

METHOD OF TREATING MILK.

No. 922,134.      Specification of Letters Patent.      Patented May 18, 1909.

Application filed September 18, 1906. Serial No. 335,131.

*To all whom it may concern:*

Be it known that I, JAMES L. GOUCHER, a citizen of the United States, and a resident of New York, in the county of New York and State of New York, have invented certain new and useful Improvements in Methods of Treating Milk, of which the following is a specification.

This invention relates to a method of treating milk to purify the same, the main object of the invention being to improve the quality of the liquid treated, which is brought about, among other things, by destroying the colonies of bacteria which are always present in milk in its ordinary state and which are propagated rapidly under the ordinary conditions surrounding the handling, shipment and use of milk which as a liquid food normally carries solid in suspension.

The destruction of bacteria in milk, particularly by electrical action, has been attempted heretofore by others, who have obtained good results, but in none of the processes with which I am familiar has any one, so far as I am aware, succeeded in eliminating from milk all or substantially all of the bacteria normally found therein. This I believe has been due partly to the fact that the proper treatment of milk by electricity for the purpose of destroying bacteria therein has not been fully understood, and partly to the fact that no sufficient provision has been made for preventing the contamination of partly purified milk by bacteria in the air surrounding such milk.

In order to destroy bacteria in milk quickly and without in other ways injuriously affecting the quality or taste of the milk, I have found by experiment that it is important to subject the milk to the action of electricity in such a manner as to avoid overheating or cooking the milk, it being preferable to employ a current of moderately high voltage and of small amperage, which will destroy the bacteria in the milk quickly, but will otherwise have little or no effect upon the milk so treated. It is most advantageous to make use of an alternating current of electricity, as the purification of the milk is accomplished more quickly than with the use of direct current.

The destruction of bacteria in milk by electrical action, I believe as the result of my experiments, to be due both to the direct action of electric current, particularly alternating current, upon the colonies of bacteria in the milk, and to the formation and release of ozone gas from the liquid, which gas when so formed and liberated exerts in the nascent state a very strong sterilizing action upon the whole body of liquid with which it comes in contact, and destroys instantly all colonies of bacteria through which the gas passes. When milk exposed to the air is subjected to the action of an alternating current of suitable voltage and amperage, the number of colonies of bacteria in each cubic centimeter of milk will be reduced far below the number ordinarily found in the best grades of milk on the market, and when the action takes place in the manner hereinafter described in detail the number of colonies in each cubic centimeter may be reduced to not more than a few hundred. I have found, however, that it is impossible under ordinary working conditions to eliminate all of the bacteria from milk when the whole body of milk is exposed to the air throughout the whole of the period during which it is subjected to the action of the electric current, and that in order to eliminate all or substantially all colonies of bacteria it is necessary, at least during the final treatment of a given quantity or stream of milk, to inclose the milk or stream in such a manner that it will be out of contact with the air, and while so out of contact with the air I subject it to the action of an electric current for the purpose of destroying such final colonies of bacteria as may have been propagated and may still remain in the milk and such other colonies as may have been introduced into the milk by contact of the air with the surface of the milk during the early stages of the treatment. By subjecting milk first to electrical action in contact with the air and afterward to electrical action out of contact with the air, and particularly when the electric current is caused to flow through a stream of milk at many points in the length thereof and in the direction transverse to the flow of the stream, I have found that all bacteria can be eliminated from milk and that the milk so purified can be bottled for use by the consumer entirely free of bacteria. Such milk, I have also found, will remain fresh and sweet for a very much longer period of time than the best untreated milk that I have found, this being an important factor in the problem of obtaining from a distance an adequate milk supply for a large city.

Other features of my improved process of purifying milk will be hereinafter more fully set forth, the various features of the invention being illustrated in the accompanying drawings, in which—

Figure 1 is a combined plan and diagrammatic view of an embodiment of the invention in a milk-treating apparatus and electrical connections for carrying out the invention; Fig. 2 is a similar view of a modified type of milk-treating apparatus; Fig. 3 is a side elevation of the main portions of the apparatus and associated parts illustrating the supply-tank, the purifying apparatus and a series of receiving tanks; Fig. 4 is an enlarged transverse section of a portion of the apparatus, the section being taken in the line 4—4, Fig. 3, looking in the direction of the arrow; Fig. 5 is a similar view illustrating the apparatus at another point in its length, the section being taken in the line 5—5; Fig. 3; and Fig. 6 is an enlarged sectional side elevation of the delivery end of the milk-purifying apparatus, illustrating the manner in which the milk is kept out of contact with the air during its final treatment and while being delivered to the receiving tanks.

Similar characters designate like parts in all the figures of the drawings.

In carrying my invention into effect I prefer to employ as the vessel in which the milk is subjected to treatment a long trough such as 2, of non-conducting material, through which the milk may flow in a relatively long stream after being delivered thereto from a suitable source of supply. This source of supply may be a tank, such as 3′, having the usual stop-cock 4′ for turning on and off the stream. The object of passing the stream through such a trough as that shown at 2 is to subject it to treatment at a considerable number of points, at each of which there will be but a comparatively small body of milk to be acted upon at any given moment. For this reason not only is the trough itself long and relatively narrow, but it is also provided with means for still further reducing the cross-sectional area of the body of milk subjected to treatment at any given point and moment, the means employed for this purpose being also preferably so constructed as to effect a very thorough agitation or mechanical stirring of the milk as it passes through the trough and is subjected to treatment. The means employed by me for effecting this mechanical agitation of the milk and thus bringing the various particles of the milk as fully as possible under the action of purifying means, are a series of baffle-plates, which will usually project alternately from opposite inner sides of the trough, and thus form an irregular or zigzag channel through which the milk will be forced to flow before it makes its exit from the delivery end of the trough. By means of such a series of partitions or baffle-plates as these the milk will be very thoroughly agitated as the result of the resistance of said baffle-plates to the direct flow of the milk in a straight line through the trough, and the milk when thus thoroughly stirred while being subjected to treatment, will be in condition to be more easily acted upon by the purifying agent or agents than if traveling in a straight line through the trough. The baffle-plates employed by me may be of any suitable type and construction, those illustrated in Fig. 1 being simply partitions projecting at right angles from the inner walls of the trough 2 and being divided into two series, the baffle-plates of one group being designated by 3 and those of the other group by 4.

The trough and its various partitions or baffle-plates may be of any suitable construction and material, these parts being, however, preferably made up wholly of insulating material, such for example as slate, which I have found in practice gives good results. As is obvious, some insulating material is essential in order that electric current may be applied directly to and passed through the milk for purifying the same. Electric current from any suitable source of supply may be applied to the moving stream of milk at practically all points in the length thereof, but the current used will preferably be an alternating current, as I have found that purification of the milk can be more readily effected by such a current than by direct current, and the time for carrying out the process and destroying all or substantially all bacteria is less than when direct current is used. The current used may be taken from any suitable source of supply, such as the ordinary power mains of a street lighting system, and stepped up by a transformer (not shown) to the desired voltage at which it will be delivered to the feed-wires 5 and 6, in which may be interposed an ordinary switch, such as 7, for making and breaking the circuit, and also one or more fuses, such as 8, for the purpose of protecting the apparatus and the milk therein from excessive current. The current employed, I have found, should not be less than 300 or 400 volts, in order to obtain the best results without unnecessary waste of time, and it may to great advantage be much higher than this. The amperage of the current will of course depend on the voltage, and whatever voltage and amperage are used they should not be so great as to unduly heat the milk, a high voltage with low amperage being preferred in order that bacteria may be destroyed quickly and with very slight heating of the milk.

I prefer to apply the electric current to the milk at the points where it passes by the respective partitions or baffle-plates 3 and 4, and each of these baffle-plates in this construction has secured to its inner end a conducting electrode, preferably of copper, connected with one of the feeders, in this case with the feed-wire 5. Opposite each of these electrodes another electrode is preferably secured to the inner wall of the trough, this electrode being also preferably a copper strip or plate. These directly opposing electrodes, affording considerable area for the emanation of common length shortest lines of current, minimize the cross-sectional density of electric current at these points of maximum mechanical current flow, and thus preclude localization of electric current as well as avoid excessive heating. The electrodes 9, 10, so oppose each other that there may be considerable cross-sectional area of straight line currents therebetween, which currents are of uniform length. The electrodes secured to the baffle-plates are designated by 9 and those secured to the walls of the trough by 10. It is essential that the electrodes be insulated from each other, except as to the substance treated, and in this instance this is accomplished by forming the trough and baffle plates, that is the mountings for the electrodes, of insulating material. The electrodes 9 are connected by short conductors 11 with the feed-wire 5, and the electrodes 10 are connected by short conductors 12 with the feed-wire 6. The electrodes 9 and 10 are arranged in pairs, and the electrodes of each pair are placed at such a distance apart as to permit the current used to pass readily and assure the destruction of the bacteria contained in the milk passing between such electrodes. By this arrangement of the pairs of electrodes it will be seen that the different pairs are connected in parallel branches of the same circuit, each of which branches contains a gap across and through which the current must flow for the purpose of destroying the bacteria. By placing these gaps at a large number of points in the length of the trough 2 a corresponding number of points is obtained at each of which the milk will be subjected to the action of the electric current and bacteria therein destroyed. Thus at the point nearest the source of supply, that is, at the receiving end of the trough, the milk will have the largest number of colonies of bacteria per cubic centimeter, and a certain percentage of these colonies will be destroyed in passing through the first gap or opening 13 between the electrodes. The milk passing through the second gap will thus have a smaller number of colonies to be destroyed, and the number of colonies per cubic centimeter will decrease at each point at which the milk is subjected to the action of the electric current. In the construction shown there are seven points at which the electric current passes transversely through a long and relatively narrow moving stream of milk, at each of which points substantially the whole body of milk passing such point is subjected to the action of the electric current while in a state of considerable agitation resulting from the resistance opposed to its flow by the alternating or staggered baffle-plates 3 and 4. It is to be noted that the operation is such that the body of the treated liquid may not become stagnant near the electrodes or where there is considerable electric current therein; that in other words there is relative movement between the substance treated and the source of electricity completing the circuit, which precludes a separation of solids from the milk.

By the time the milk reaches the last pair of electrodes in the series all or substantially all of the bacteria propagated in the milk are destroyed, and it only remains to prevent the contamination of the purified milk by air bacteria during the delivery of the purified milk into the receiving vessel or vessels. This may be accomplished by leading the stream of milk to any suitable closed channel or passage which is out of contact with the air. In the apparatus shown the delivery end of the trough 2 is covered for a short distance, in any suitable manner, as for example by a sheet or plate of glass 14, which may be held in position by the frame 15 secured as by screws 16 to the top of the delivery end of the trough. This cover 14 should extend over the last pair of electrodes of the series, in order that the milk may be subjected to the final purifying treatment after it has passed under the cover 14 and is out of contact with the air. If, during purification, and after the destruction of the bacteria propagated in the milk, bacteria in the air which comes in contact with the purified milk get into such purified milk, these bacteria will be destroyed by the current passing between the last pair of electrodes, and the milk which passes into the inclosed space at the delivery end of the trough 2 will contain no bacteria of any kind. From this inclosed space at the end of the trough the purified milk may be delivered, without coming in contact with the air, into one or more suitable receiving vessels or tanks, such as 17, 18 and 19, connected in series. A pipe 20 connects the inclosed delivery end of the trough with the first receiving tank 17 and is controlled by a suitable stop-cock 21, by which the delivery of the purified milk may be regulated or completely cut off. The tanks 17, 18 and 19 are connected by couplings, such as 22 and 23, in which are interposed stop-cocks 24 and 25 by means of which both of the receiving tanks 18 and 19 may be cut off from the tank 17, or the two tanks 17 and 18 connected while the tank 19 is cut off, or all three of the tanks connected, as may be desired. In this way either a single tank may be filled, or the first